United States Patent [19]

Remmel et al.

[11] Patent Number: 4,667,085
[45] Date of Patent: May 19, 1987

[54] ROLLED BEADED EDGE OIL CORE FRY PAN

[75] Inventors: Wayne R. Remmel; Mark S. Steinhardt, both of Kewaskum, Wis.

[73] Assignee: Regal Ware, Inc., Kewaskum, Wis.

[21] Appl. No.: 720,675

[22] Filed: Apr. 8, 1985

[51] Int. Cl.[4] ............................................. A47J 27/10
[52] U.S. Cl. ................................. 219/439; 219/430; 219/436
[58] Field of Search ............... 219/429, 430, 431, 432, 219/436, 437, 438, 439, 440, 441, 521, 530; 79/472, 438; 126/374, 376, 377, 378, 390; 220/405, 68, 426, 427, 428; 165/104, 105

[56] References Cited

U.S. PATENT DOCUMENTS

| | | | |
|---|---|---|---|
| 90,707 | 6/1869 | Walters | 126/373 |
| 1,028,107 | 6/1912 | Hadaway, Jr. et al. | 219/439 X |
| 1,407,088 | 2/1922 | Samuels | 126/373 |
| 1,493,459 | 5/1924 | Jancikin | 219/439 X |
| 1,983,118 | 12/1934 | Bourque | 219/431 X |
| 2,507,666 | 5/1950 | Goldthwaite | 219/431 |
| 2,817,744 | 12/1957 | Free | 219/439 |
| 2,969,452 | 1/1961 | Geller et al. | 219/437 X |
| 3,038,058 | 6/1962 | Gordon | 219/508 |
| 3,148,676 | 9/1964 | Truog | 126/246 |
| 3,199,712 | 8/1965 | Nurkiewicz | 220/3 |
| 3,294,039 | 12/1966 | Ogden | 219/439 X |
| 3,322,113 | 5/1967 | Simjian | 126/390 |
| 3,769,902 | 11/1973 | Hurwitz | 99/472 |
| 3,815,575 | 6/1974 | Danis | 126/390 |
| 3,968,787 | 7/1976 | Basiulis | 126/390 |
| 4,055,271 | 10/1977 | Kronenwetter | 220/64 |
| 4,063,068 | 12/1977 | Johnson et al. | 219/441 |
| 4,293,090 | 10/1981 | Gardner | 229/5.6 |
| 4,343,292 | 8/1982 | Kells | 126/378 |
| 4,490,597 | 12/1984 | Mengel | 219/440 |

FOREIGN PATENT DOCUMENTS

| | | |
|---|---|---|
| 235419 | 8/1964 | Australia . |
| 2033048 | 1/1972 | Fed. Rep. of Germany . |
| 1563188 | 4/1969 | France . |

OTHER PUBLICATIONS

Mills, Wallace C., "Top and Bottom Attachment . . . ", Product Engineering, Aug. 1945, pp. 544–545.

*Primary Examiner*—E. A. Goldberg
*Assistant Examiner*—Teresa J. Walberg
*Attorney, Agent, or Firm*—Wheeler Law Firm

[57] ABSTRACT

A cooking pan having an inner shell and an outer shell between which is an oil filled cavity containing a heating element the inner shell being secured to the outer shell by a rolled beaded edge formed in such a manner that the free edges of the respective inner shell and outer shell are not in contact with one another because the outer margin of the inner shell has been pre-beaded, the outer margin of the outer shell has been folded, and the relationship between the two is such that the folded portion is spaced slightly from the pre-beaded portion. The oil filling hole is provided with a circumferential seat against which an O-ring is urged by a cup-shaped plug for the hole backed by a spring and spring retainer held in position by a handle bracket provided with a spring retainer backing plate so that the oil filling hole plug functions also as a relief valve which is completely concealed beneath the handle.

13 Claims, 5 Drawing Figures

ROLLED BEADED EDGE OIL CORE FRY PAN

BACKGROUND OF THE INVENTION

The closest known prior art to the present invention is Geller et al U.S. Pat. No. 2,969,452 issued in 1961. That patent shows an electrically heated pan in which the heat is distributed by an oil bath. FIG 3 of the Geller patent shows that the inner container and the outer container which receive the oil between them are brought to contacting surfaces at the top edge which are welded to form a seal. In practice, while this generally works it does have some disadvantages. In order to form a finished edge the welded area must be ground, which is an extra finishing operation, and grinding will sometimes expose imperfections in the weld which can cause uncontrolled leakage. Geller discloses that his oil cavity is filled at an opening 21 which is sealed by applying the handle to the pan. Such a seal may or may not be effective and may or may not be permanent. It affords no opportunity for pressure relief if needed.

SUMMARY OF THE INVENTION

This invention seals the inner pan to the outer pan by means of a rolled beaded edge which is preferably begun by pre-beading the edge of the inner pan to insure proper bead formation and lengthen tool life. The inner pan or shell may if desired by made of a number of layers, such as a stainless steel layer on the side that contacts the food and a heat conducting layer such as carbon steel on the side away from the food. Other layers of these or other materials may be added. This invention involves putting a pre-bead at the edge of the inner shell. The free edge of the outer shell is turned upon itself to form a first fold which is kept below the pre-beaded free edge of the inner shell and out of contact with it when the remainder of the edge bead is formed from the edges of the inner shell and outer shell, so that in forming the rolled beaded edge a tight seal is formed between the two shells.

Another novel feature of the invention is the use of a cup shaped member with an out-turned edge to back an O-ring to seal the oil filled opening in the outer shell. A seat for the O-ring is formed in the outer shell. The cup shaped member is backed by a spring and spring retainer and the spring retainer is held by a fork formed on the handle bracket to receive it. Not only does this structure seal the hole through which the inner cavity of the pan is filled with oil, but the structure also serves as a pressure relief valve to prevent damage and leakage elsewhere.

DRAWINGS

DESCRIPTION

Figure 1:
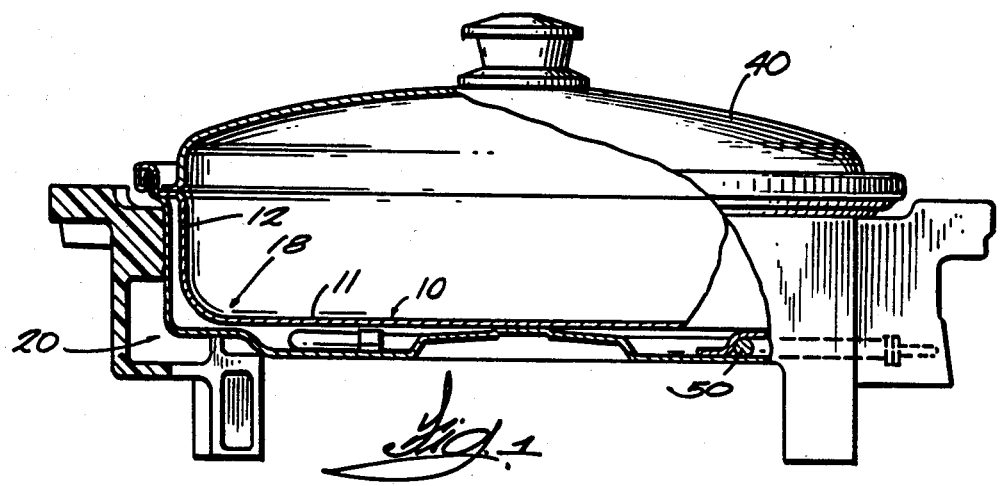
FIG. 1 is a side elevational view of the pan of our invention with portions broken away to a vertical cross-sectional view.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In general the pan of this invention includes an inner pan 10 and an outer pan 20. Usually a cover 40 will also be included.

Desirably at least the inner pan or shell 10 is composed of at least two layers, a stainless steel layer exposed to the food to be cooked in the pan and a layer which is a better heat conductor than stainless steel which is exposed to the oil cavity between the inner shell 10 and the outer shell 20. Because these layers are conventional they are not separately shown. Other layers may be added.

Figure 2:
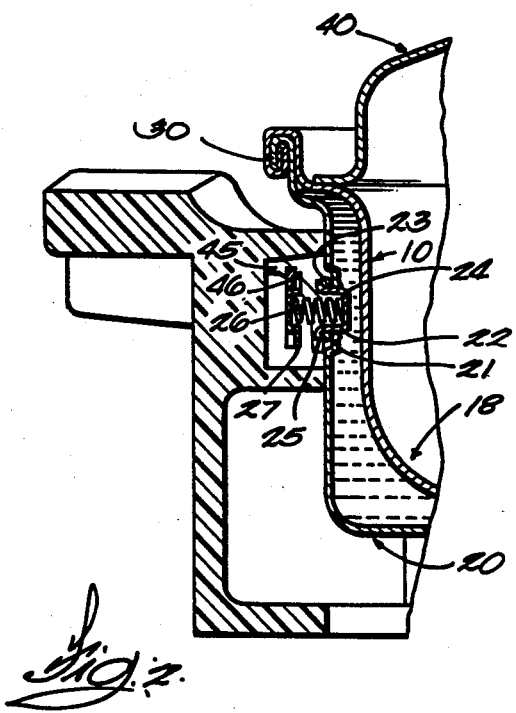
FIG. 2 is an enlarged fragmentary vertical cross-sectional view similar to FIG. 1 but showing the relief valve area.

The inner pan 10 consists of a bottom 11 and a circumferential side wall 12. Before the inner and outer pans are assembled the inner pan 10 has an upper edge consisting of a horizontal flange 13, a vertical flange 14, and a terminal horizontal flange 15. A pre-bead 16 consisting of a down-turned margin on horizontal flange 15 is formed at this stage. The pre-bead forms a stainless steel curved edge that helps to form the rolled edge seal and improves the life of the forming tools. As shown best in FIGS. 2, 3, and 5, the outer pan or shell 20 has a margin which is folded once at 29 to present a curved margin that is separated from the pre-bead edge of inner pan 10.

Figure 5:
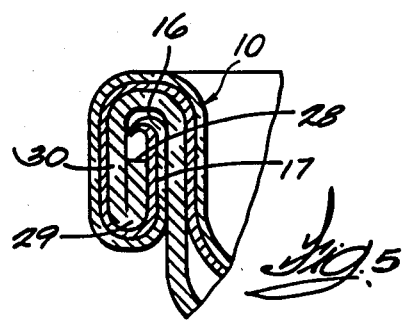
FIG. 5 is a detailed cross-sectional view of the final rolled edge.

The rolled beaded edge is then formed as shown in FIG. 5 forming a tight seam which has no need of grinding or other surfacing and in which the edges of the respective shapes are separated from one another. By separating the edges and allowing contact only with stainless steel surfaces corrosion and other problems can be avoided even where the layers are dissimilar, but even in the case of similar metals the forming and sealing of the edges of shells 10 and 20 is made better by these steps.

Figure 3:
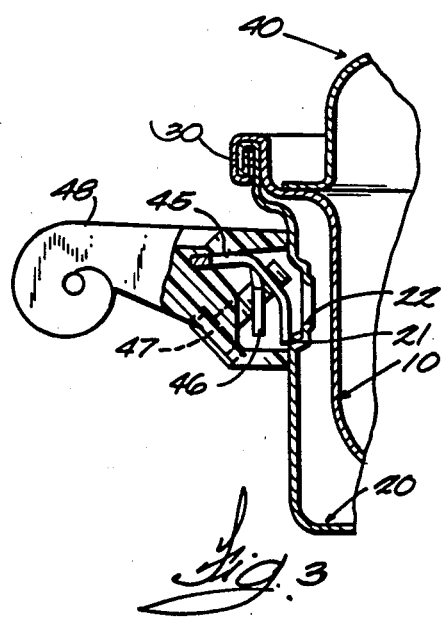
FIG. 3 is a view similar to FIG. 2 but but taken on a different vertical cross-sectional so that the pressure valve is not shown, showing a different style of handle and further detail on the manner in which the relief valve is secured.

At the side of the outer shell 20 is a depressed area 21 which is circular in form and extends around the hole 22 to form a seat for an O-ring 23 which is held around a cup 24 that has a rim 25 extending back of the O-ring and urging it towards the seat. A spring 26 is backed by a spring retainer 27. A bracket 45 is secured to outer shell 20 and includes a backing plate 46 extending behind spring retainer 27. As best shown in FIG. 3 the bracket 45 also provides anchorage for a handle screw 47 to secure the handle 48 of any appropriate style. The styling of the handle is not related to the invention. The attachment of handle bracket 45 to outer pan shell 20 is not shown but may be accomplished in any conventional way.

Figure 4:
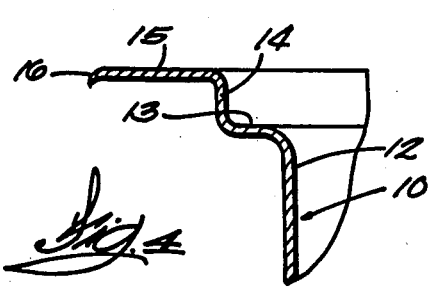
FIG. 4 is a vertical cross-sectional view through the edge of the inner pan before the inner and outer pan edges are rolled together, showing the pre-bead.

As best shown in FIGS. 4 and 5 the rolled beaded edge that seals inner pan shell 10 to outer pan shell 20 is also an important part of this invention. In FIG. 4 the inner pan or shell 10 is shown with a bottom 11, a vertical circumferential side 12 extending around the entire pan, topped by a horizontal flange 13 extending around the pan, a vertical flange 14 extending around the pan, a final horizontal flange 15 extending around the pan, and a pre-beaded edge 16. Flange 15 and pre-beaded 16 are turned with rim 30 of the outer pan to form the rolled edge bead, shown in FIG. 5 after the edge has been completed.

In forming the rolled edge of FIG. 5 the outer margin 28 of lower pan or shell 20 is folded at 29 so that margin 28 is too short to reach pre-beaded edge 16 of inner pan 10. The respective rims 15 and 30 are then rolled under in a relatively conventional way to form the rolled beaded edge shown in FIG. 5, but in which the respective edges 28 and 16 are out of contact with one another and margin 16 in particular is curved inward into free space. An optional separate layer is shown only in figure 5 which is sufficiently enlarged so that heat conducting layer 17 of inner shell 10 may be shown. If used this layer would typically line the entire surface of inner shell 10 on the side contacting the oil filled cavity where the heating element 50 is located in conventional manner. The showing of two layers is merely illustrative. A different number may be used, or the entire shell may be a single layer as shown in FIGS. 1-4.

We claim:

1. In a cooking pan having an outer shell and an inner shell sealed together at their circumferential margins to enclose an oil filled cavity containing a heating element, the novelty comprising:
    the margin of the inner shell and the margin of the outer shell being formed into a rolled edge bead sealing the two shells together at their margins,
    said outer shell being provided with an oil fill hole surrounded by an O-ring seat,
    a cup shaped plug for the oil fill hole having an outwardly turned flange,
    an O-ring on the outer surface of said cup backed by said outwardly turned flange,
    a spring bearing on the bottom of the inside of said cup to urge said O-ring toward said O-ring seat,
    and means securing the outer end of said spring to said outer shell.

2. The device of claim 1 in which the entire edge of the outer shell is folded under before forming within the rolled edge bead.

3. The device of claim 1 in which the inner shell margin is pre-beaded to form a downwardly turned curl around the entire circumference of the inner shell.

4. The device of claim 3 in which the entire edge of the outer shell is folded under within the rolled edge bead.

5. The device of claim 1 in which the means for securing said spring to said outer shell comprises a handle bracket provided with a backing plate, and a spring retainer removably secured to said spring and resting against said backing plate.

6. The device of claim 1 in which the bracket also serves as the means for attaching a handle which conceals the oil fill hole, the O-ring, the cup, the spring, and the spring retainer from view.

7. In a cooking pan having an outer shell and an inner shell sealed together at their edges to enclose an oil filled cavity containing a heating element the novelty comprising:
    said outer shell being provided with an oil filling hole surrounded by an O-ring seat,
    a plug for said hole carrying an O-ring,
    means secured to said outer shell for biasing said O-ring toward said seat,
    said plug for the oil fill hole being cup-shaped and having an outwardly turned flange,
    an O-ring on the outer surface of said cup-shaped plug backed by said outwardly turned flange,
    a spring bearing on said cup-shaped plug to urge said O-ring toward said O-ring seat,
    and means securing the outer end of said spring to said outer shell.

8. The device of claim 7 in which said pan further comprises a handle, and said oil filling hole, plug and O-ring are covered by a handle bracket for securing said handle secured to said outer shell.

9. The device of claim 7 in which the means biasing the O-ring toward the O-ring seat further comprises a handle bracket secured to said outer shell, said handle bracket being provided with retaining means to secure said spring in operating position and being further provided with handle mounting means to which said handle is mounted.

10. The device of claim 7 in which the inner shell margin is pre-beaded to form a downwardly turned curl around the entire circumference of the inner shell before forming a rolled beaded edge connecting and sealing the shells together.

11. The device of claim 7 in which the entire edge of the outer shell is folded before forming a rolled beaded edge in which the inner shell and outer shell margins are rolled together.

12. The device of claim 7 in which said plug for the oil fill hole is cup-shaped having an outwardly turned flange, an O-ring on the outer surface of said cup backed by said outwardly turned flange, a spring bearing on said cup to urge said O-ring toward said O-ring seat, and means securing the outer end of said spring to said outer shell.

13. The device of claim 7 in which the means for securing said spring to said outer shell comprises a handle bracket provided with a backing plate, and a spring retainer removably secured to said spring and resting against said backing plate.

* * * * *